Feb. 6, 1962    D. L. TURNER    3,020,529
REFLECTED POWER ALARM FOR A VARIABLE POWER
OUTPUT ANTENNA SYSTEM
Filed Dec. 21, 1959    2 Sheets-Sheet 1

INVENTOR.
DANIEL L. TURNER
BY *[signature]*
ATTORNEY

3,020,529
REFLECTED POWER ALARM FOR A VARIABLE POWER OUTPUT ANTENNA SYSTEM

Daniel L. Turner, Belmont, Calif., assignor to Collins Radio Company, Cedar Rapids, Iowa, a corporation of Iowa
Filed Dec. 21, 1959, Ser. No. 860,944
3 Claims. (Cl. 340—253)

This invention deals generally with transmission line monitors and more particularly with a voltage standing wave monitor for a transmission line such that when the standing wave on the transmission line exceeds a certain predetermined ratio, an alarm will be sounded and/or the transmitting equipment will be disabled.

Transmission line monitors in the past have been adequate if the transmitted power were to remain constant. Under these conditions a directional coupler was utilized to measure the reflected power. The output of the directional coupler was connected through a means such as an amplifier to a relay such that when the reflected power exceeded a predetermined level, the relay was energized. Operation of the relay caused an alarm to operate and could also simultaneously shut off the transmission equipment. However, if the total output power increased or decreased either due to a variation in the loading of the transmission line or due to a variation in the power output of the transmitter, the voltage standing wave monitor was rendered inaccurate. Therefore, if transmitter power output was varied by the operator, if the transmitter power was shifted due to a change in circuit conditions, or if the loading of the transmission line was changed, the monitor became completely unreliable; therefore, it no longer rendered the protection for which it was designed.

It is, therefore, an object of this invention to provide a transmission line monitor which is insensitive to changes in transmission line power level regardless of whether the power level change is caused by a variation either at the transmitter or at the load.

It is another object of this invention to provide a transmission line monitor which will monitor any predetermined voltage standing wave ratio.

It is a further object of this invention to provide a voltage standing wave ratio monitor which will operate in an extremely rapid manner thereby providing the maximum protection for the transmission line and the transmitter equipment.

This invention features a transmission line voltage standing wave ratio (VSWR) monitor which uses the output voltage from an incident power directional coupler or probe to modify the amplification of the reflected power directional coupler voltage preceding the alarm circuit of the monitor such that the monitor will always operate at the proper predetermined VSWR regardless of a variation in the incident power level. The modified voltage from the reflected power directional coupler is then used to operate an alarm circuit.

Further objects, features, and advantages of the invention will become apparent from the following description and claims when read in view of the accompanying drawings, in which:

Figure 1:
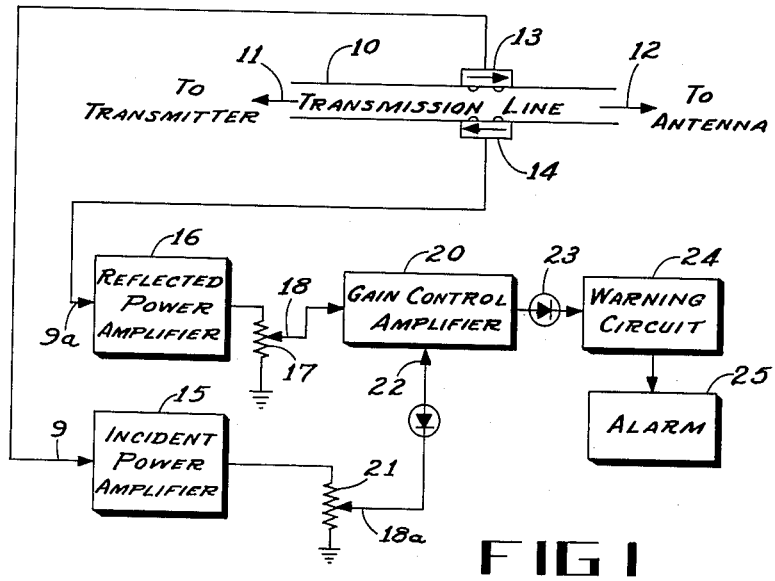
FIGURE 1 is a block diagram of the preferred embodiment of this invention.

Referring to the block diagram in FIGURE 1, a transmission line 10 has one end such as 11 connected to a transmitter or power generating source. The remaining end 12 is connected to a load such as an antenna. Inserted within the transmission line 10 is a pair of couplers 13 and 14. Coupler 13 which may be a probe or directional coupler, is connected to an incident power amplifier 15. Incident power amplifier 15 may be a direct-current amplifier or other form of amplifier which will amplify the output of coupler 13. Coupler 14, a directional coupler, is connected to a reflected power amplifier 16 which likewise may be a direct-current amplifier. Means for setting the output voltage magnitude, such as level setting potentiometer 17 may have its output arm 18 connected to the input of the gain control amplifier 20. The output of the incident output amplifier 15 likewise may contain a level setting means such as potentiometer 21, the output arm 18a is connected to a second input 22 of the gain control amplifier. The output of the gain control amplifier is detected by a detector 23 and applied to the input of the warning circuit 24. The output of the warning circuit is applied to a warning means such as an alarm 25.

The operation of this circuit is explained as follows. As power is transmitted down the transmission line 10 toward the load or antenna, a voltage will be picked up by coupler 13 which will be directly proportional to the transmitted power. Coupler 13 contains a diode or rectifying means which converts the radio-frequency voltage from the transmission line to a comparable direct-current potential. The output of coupler 13 is then applied to the input 9 of incident power amplifier 15. Incident power amplifier 15 amplifies the direct-current voltage from probe 13 and applies it to the gain control amplifier in the form of a gain control voltage. The magnitude of the gain control voltage, then, is directly proportional to the magnitude of the transmitted power.

Figure 2:
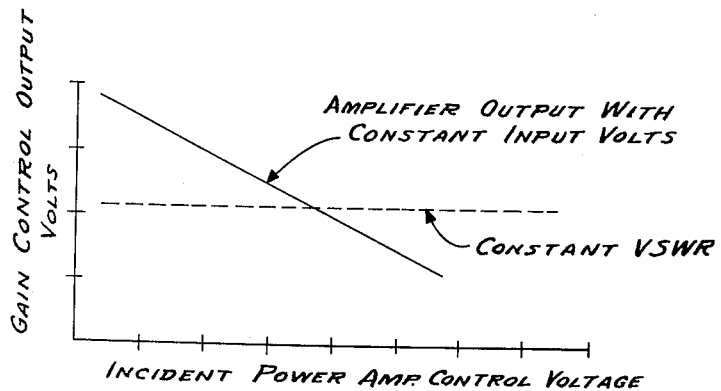
FIGURE 2 is a plot of the output voltage from the control amplifier versus incident power amplifier control voltage.

Directional coupler 14 is designed to be sensitive only to reflected power. Directional coupler 14 likewise is of the type which converts the R-F reflected power into a direct-current voltage of comparable magnitude and applies it to the input 9a of reflected power amplifier 16 which may be a direct-coupled amplifier. The output of reflected power amplifier 16 is applied to gain control amplifier 20. The gain control amplifier is designed so that its signal gain will vary inversely proportional to the incident power amplifier control voltage; that is, the smaller the incident power control voltage, the larger the amplification of the gain control amplifier 20. The circuit is further designed so that the gain characteristic of the amplifier 20, that is, the gain control amplifier output volts versus incident power amplifier control voltage, will exactly match the curve of the directional coupler 14. This relationship is extremely important if the circuit is to be insensitive to power changes in the transmission line. For example, if the transmitted power is 100 watts and the reflected power is 1 watt, the standing wave ratio will be .1. However, if the transmission power were increased to 1,000 watts, the same voltage standing wave ratio (.1) would require a reflected power of 10 watts. Thus the output from the reflected power amplifier 16 has substantially increased for the same voltage standing wave ratio. Therefore, this increase must be corrected by a corresponding decrease in the amplification of gain control amplifier 20 if the output voltage at 23 is to remain constant for the same voltage standing wave ratio. Referring to FIGURE 2, if the incident power increases and the input voltage is kept constant, the output from the amplifier will decrease. The circuit constants of the amplifier must be designed such that the resulting curve corresponds to the curve of the reflected power directional coupler. Therefore, if a larger control signal is applied to the gain control amplifier from the incident power amplifier, the gain of the control amplifier is proportionally reduced. Thus a constant output voltage is maintained across detector 23 for the same standing wave ratio regardless of a variation in transmission power line level. Once the warning circuit exceeds the predetermined level for operation, sufficient voltage will be developed at warning circuit 24 to operate the warning alarm 25. In addition to the audible or visual alarm the transmitter may be rendered inoperative to further protect the equipment.

Potentiometers 17 and 21 provide the means for setting the predetermined level for alarm 25. External means for measuring the voltage level from both couplers 13 and 14 must be initially provided so that the voltage standing wave ratio can be determined. A separate direct-current source such as a battery may be initially used to set the warning circuit 24 to a predetermined voltage standing wave ratio. Potentiometer 21 when once properly set usually does not need to be readjusted. Potentiometer 17 will be varied in accordance with the predetermined warning level. Potentiometer 17 may also include an approximate calibration scale to facilitate rapid adjustment if desired.

Figure 3:
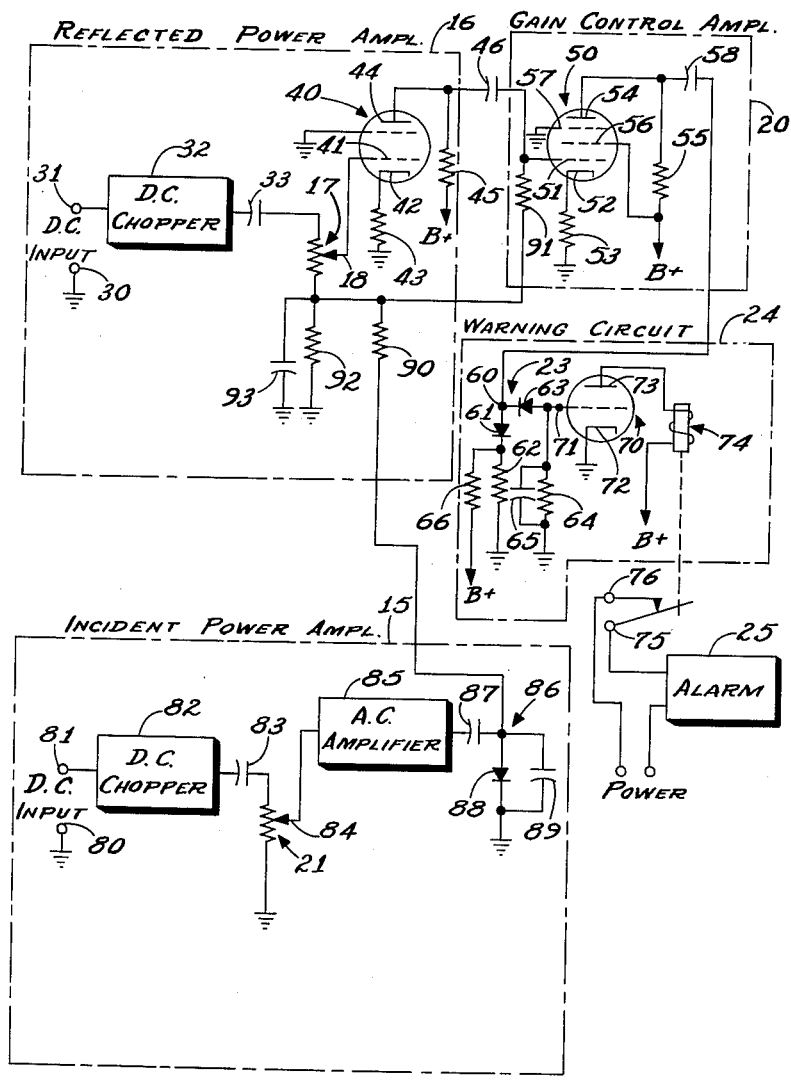
FIGURE 3 is a circuit diagram of the preferred embodiment of this invention.

A partial schematic of the preferred embodiment of the invention is shown in FIGURE 3. The reflected power amplifier 16 is provided with a pair of input terminals 30 and 31. A terminal 30 is connected to ground and a terminal 31 is connected to a direct-current chopper 32. The output of the direct-current chopper is applied through an isolating capacitor 33 to level setting potentiometer 17, the output arm 18 of potentiometer 17 is connected to grid 41 of a tube 40. Cathode 42 is connected to ground through resistor 43. Plate 44 is connected to a source of potential through resistor 45. Plate 44 is also connected to grid 51 of tube 50 through capacitor 46. The cathode 52 is connected to ground through cathode biasing resistor 53. The plate 54 is connected to a source of power through resistor 55. Screen grid 56 is connected directly to the source of power and the suppressor grid 57 is connected directly to ground. Plate 54 is also connected to the input terminal 60 of detector 23 through capacitor 58. Detector 23 comprises a diode 61 and resistor 62 serially connected to ground and a diode 63 and resistor 64 serially connected to ground. Capacitor 65 is parallelly connected across resistor 64. Resistor 66 is connected between a source of power and the junction of diode 61 and resistor 62. The grid 71 of tube 70 is connected to the junction between diode 63 and resistor 64. Cathode 72 is connected to ground and plate 73 is connected to a source of power through a relay 74. Relay 74 is mechanically coupled to contacts 75 and 76. Contact 76 is connected to a source of power and contact 75 is mechanically coupled to the relay and electrically coupled to the alarm circuit 25. Incident power amplifier 15 has its inputs 80 and 81 connected to the incident directional coupler 13 (see FIGURE 1). Terminal 80 is connected to ground and terminal 81 is connected to the input of direct-current chopper 82 or other conversion source. The output of the direct-current chopper is connected to a level setting potentiometer 21 through a capacitor 83. The output 84 of level setting potentiometer 21 is connected to the input of alternating-current amplifier 85. A detecting circuit 86 is connected to the output of the alternating-current amplifier 85 by means of a capacitor 87. The detecting circuit 86 includes a diode 88 and capacitor 89 parallelly connected with one end connected to ground and the remaining end connected to the output of capacitor 87. The output of capacitor 87 is likewise connected to the grid 51 of tube 50 through serially connected resistors 90 and 91. Resistor 92 is parallelly connected to capacitor 93 with one end connected to ground and the remaining end connected to the junction between the resistors 90 and 91. One end of level setting potentiometer 17 is likewise connected to the junction between resistors 90 and 91.

The operation of this circuit is as follows. A direct-current voltage which is proportional to the reflected power down the transmission line 10 is applied to terminals 30 and 31 of reflected power amplifier 16. The direct-current voltage is then converted to alternating-current by means of a chopper or other well-known modulator 32. The output is coupled to a level setting potentiometer 17 through a capacitor 33. The output voltage from arm 18 of the level setting potentiometer 17 is then amplified in an alternating-current amplifier 40 and subsequently coupled to the grid 51 of the gain control amplifier tube 50 by means of capacitor 46. The output of the gain control amplifier is applied through capacitor 58 to detector 23 at junction 60 where the alternating-current is again converted to direct current. Diodes 61 and 63 and the associated resistors 66 and 62 and capacitor 65 form the full wave detector 23. As the voltage level at the grid 71 increases, the current through tube 70 increases until relay 74 has sufficient magnetization to cause contacts 75 and 76 to close thereby completing the power source to the alarm circuit 25 which will cause it to operate. Power from the transmission line is sampled by a probe or directional coupler 13 (see FIGURE 1) which is applied to the inputs 80 and 81 of incident power amplifier 15. A second direct-current chopper 82 converts the direct current from the directional couplers or probes to alternating current. The output is applied through capacitor 83 to level setting potentiometer 21 and subsequently to amplifier 85 where it is again converted to direct current by detector 86. Diode 88 and capacitor 89 accomplish the detection. The output of the detector 86 is applied to the grid 51 of gain control amplifier 20. The control voltage from detector 86 is negative due to the polarization of diode 88. Thus as the control voltage from this detector increases, more negative voltage will be applied to the grid 51 of the gain control amplifier which will cause an over-all decrease in the gain of tube 50. The circuit components including tube 50 are selected so that this gain curve versus incident power amplifier control voltage as shown in FIGURE 2 will correspond to the output of the directional coupler 14. As the incident power amplifier control voltage increases, the gain control amplifier output voltage decreases if a constant voltage is maintained at its input. As previously explained, this curve is necessary if the monitor is to be insensitive to changes in transmission line power. A gain control amplifier has been constructed in accordance with the teaching of this invention having components with the following values:

| | |
|---|---|
| Tube 50 | Type 6BJ6. |
| Resistor 91 | 1 megohm. |
| Resistor 53 | 68 ohms. |
| Resistor 55 | 10 K ohms. |
| Capacitor 46 | .022 microfarads. |
| Capacitor 58 | .022 microfarads. |

It is to be understood that this invention is not so limited that other component values may not be substituted that are within the scope of this invention.

The output from the gain control amplifier 20 is capacitively coupled through capacitor 58 to the junction 60 of a voltage doubling detector 23. The voltage doubling detector is a well-known form of detection. However, it is positively biased through resistor 66 and 62, resistor 66 being connected to a source of B+. The positive bias is applied through diode 61 and 63 to grid 71 of tube 70. Grid 71 being positive causes current to flow through relay 74 opening contacts 75 and 76. Therefore, as long as B+ is applied to the circuit, the alarm will not operate. This is a fail safe addition to the circuit since any failure in the supply of voltage or the circuit will cause current to cease flowing through relay 74 and thereby cause alarm 25 to operate. Negative voltage at the grid 71 which is caused by the signal from the gain control amplifier 20, is applied to the junction 60. When the voltage at grid 71 becomes sufficiently negative to override the positive voltage applied to grid 71 from the B+ source, the tube will be cut off causing the alarm to operate.

Coupler 13 has been shown to be a directional coupler; however, it could also, for example, be a probe capable of measuring both incident and reflected power in the transmission line. The voltage from the probe would possess inaccuracies since it contains both the incident and reflected power. However, the total error introduced would be of minor importance; therefore a probe rather than a directional coupler could be substituted for the directional coupler 13.

Although this invention has been described with respect to a particular embodiment thereof, it is not to be so limited, as changes and modifications may be made therein which are within the spirit and scope of the invention as defined by the appended claims.

I claim:

1. A monitoring circuit for detecting and indicating in a load terminated transmission means the presence of a standing voltage wave ratio greater than a predetermined value, said monitoring circuit comprising first extracting means for extracting a portion of the reflected energy reflected back from said load, second extracting means for extracting a portion of the incident energy transmitted along the transmission means toward said load, first means including a first amplifier means constructed to amplify said extracted portion of said reflected energy, second means for supplying to said amplifier means a signal derived from and proportional to said incident energy, said amplifier means constructed and arranged to respond to said derived signal to have its amplification factor varied inversely with the magnitude of said derived signal to maintain the magnitude of the amplified portion of the reflected energy substantially constant for a given ratio of the magnitude of the extracted reflected signal to the magnitude of the extracted incident signal, and means responsive to the magnitude of the output signal of said amplifier means to indicate when the amplified portion of the reflected energy means exceeds a predetermined level.

2. A monitoring system in accordance with claim 1 in which said second means includes a second amplifier means interposed between said second extracting means and said first amplifier means, and in which said first means comprises a third amplifier means interposed between said first extracting means and said first amplifier means, and in which said second means further comprises circuit means for converting the output of said second amplifier means to a D.C. signal to control the amplification factor of said first amplifier means.

3. A monitoring system in accordance with claim 1 in which said first amplifier means comprises an electron valve having control electrode means, means for supplying the output signal of said third amplifier means to said control electrode means and means for supplying the D.C. output signal of said second means to said control electrode means.

References Cited in the file of this patent

UNITED STATES PATENTS

| | | |
|---|---|---|
| 2,312,260 | Miller | Feb. 23, 1943 |
| 2,602,885 | Armstrong | July 8, 1952 |
| 2,654,863 | Riblet | Oct. 6, 1953 |
| 2,806,994 | Johnson | Sept. 17, 1957 |